(12) United States Patent
Terada et al.

(10) Patent No.: US 8,393,673 B2
(45) Date of Patent: Mar. 12, 2013

(54) FRONT VEHICLE-BODY STRUCTURE OF VEHICLE

(75) Inventors: Sakayu Terada, Hiroshima (JP);
Hiromasa Honji, Hiroshima (JP);
Masanobu Fukushima, Hiroshima (JP)

(73) Assignee: Mazda Motor Corporation (JP)

( * ) Notice: Subject to any disclaimer, the term of this patent is extended or adjusted under 35 U.S.C. 154(b) by 155 days.

(21) Appl. No.: 12/904,824

(22) Filed: Oct. 14, 2010

(65) Prior Publication Data

US 2011/0095568 A1 Apr. 28, 2011

(30) Foreign Application Priority Data

Oct. 26, 2009 (JP) ................. 2009-245349

(51) Int. Cl.
*B60N 99/00* (2006.01)
(52) U.S. Cl. .................. 296/193.09; 296/187.09
(58) Field of Classification Search ............. 296/187.03, 296/187.09, 193.09
See application file for complete search history.

(56) References Cited

U.S. PATENT DOCUMENTS

| | | |
|---|---|---|
| 2005/0189788 A1 | 9/2005 | Cornell et al. |
| 2010/0026047 A1 | 2/2010 | Baccouche et al. |

FOREIGN PATENT DOCUMENTS

| | | |
|---|---|---|
| EP | 1 149 756 A2 | 10/2001 |
| EP | 2 070 805 A1 | 6/2009 |
| EP | 2 105 372 A1 | 9/2009 |
| FR | 2 809 072 A1 | 11/2001 |
| JP | 2009-137380 A | 6/2009 |
| WO | 03/042024 A1 | 5/2003 |
| WO | 2006/040732 A1 | 4/2006 |

OTHER PUBLICATIONS

The Extended European Search Report dated Jun. 8, 2011; Application No. /Patent No. 10012436.1-2425 / 2314500.
The Partial European Search Report dated Jan. 13, 2011; Application No. 10012436.1-2425.

*Primary Examiner* — Lori Lyjak
(74) *Attorney, Agent, or Firm* — Studebaker & Brackett PC; Donald R. Studebaker

(57) ABSTRACT

Part of a front side frame is configured to be deformed so as to bend outwardly, in a vehicle width direction, by a collision load in a vehicle frontal collision. A sub frame provided at a lower portion of a front vehicle body is joined to the front side frame via a reinforcement. A front portion of the reinforcement is located at a position which corresponds to a bending portion of the front side frame which is to be deformed so as to bend outwardly, in the vehicle width direction, by the collision load in the vehicle frontal collision. Accordingly, the bending of the front side frame at its bending portion when the collision load acts in the vehicle frontal collision can be promoted, so that the collision load against passengers can be decreased securely.

7 Claims, 12 Drawing Sheets

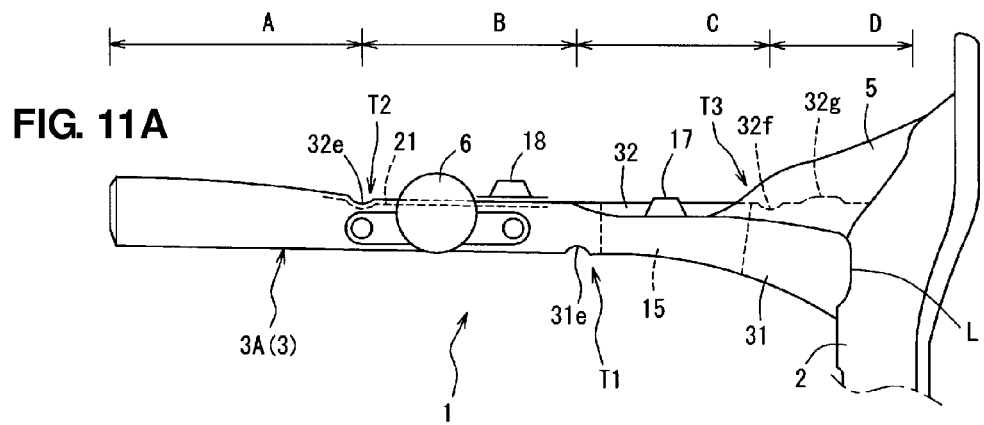
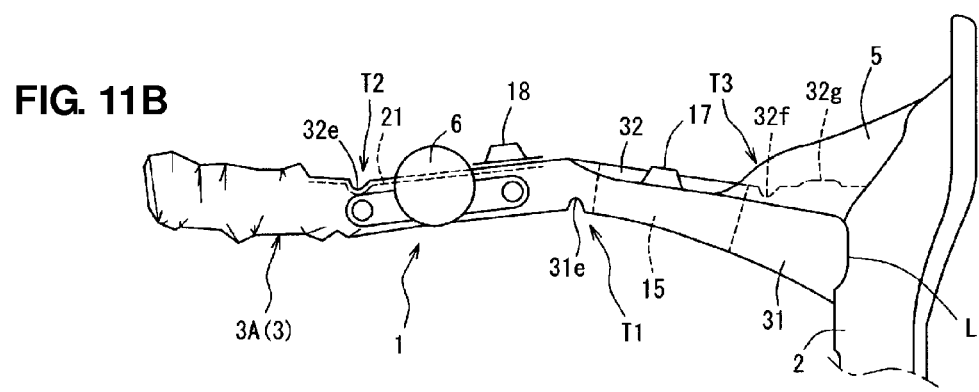
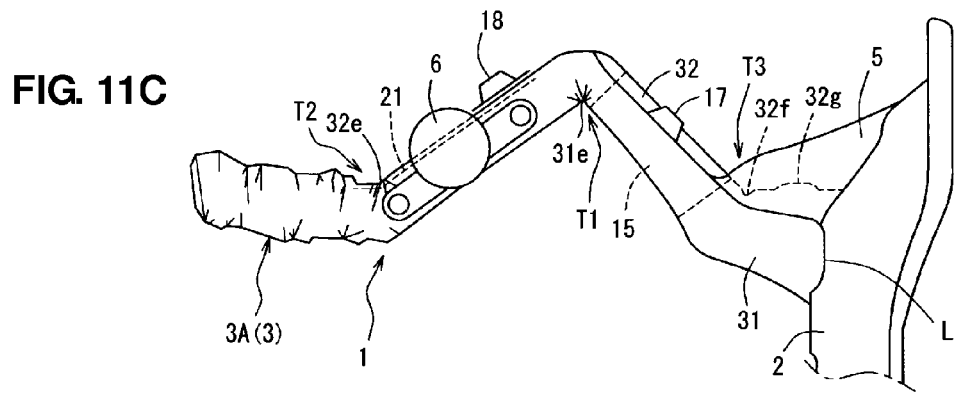

FRONT VEHICLE-BODY STRUCTURE OF VEHICLE

BACKGROUND OF THE INVENTION

The present invention relates to a front vehicle-body structure of a vehicle, in which part of a front side frame which is connected to a front side of a dash panel and extends in a vehicle longitudinal direction is configured to be deformed so as to bend outwardly, in a vehicle width direction, by a collision load in a vehicle frontal collision.

Conventionally, a structure in which in order to decrease a collision load against passengers in a vehicle collision, the front side frame extending in the vehicle longitudinal direction in front of the dash panel bends in the vehicle width direction and thereby absorbs collision energy of the vehicle collision is known.

Japanese Patent Laid-Open Publication No. 2009-137380, for example, discloses a vehicle-body structure in which the front side frame has a bending portion which is to be deformed so as to bend outwardly, in the vehicle width direction, by the collision load in the vehicle frontal collision.

In the vehicle-body structure shown in the above-described publication, there is provided a branch frame which extends upwardly and rearwardly from a specified position of the front side frame in front of the above-described bending portion to the dash panel. According to this vehicle-body structure, since a vertical deformation of the front side frame when the collision load acts from the vehicle front is restrained by the branch frame, the above-described bending outwardly may be promoted.

However, only the above-described restraint of the vertical deformation of the front side frame may be insufficient for obtaining the proper bending of the front side frame. Accordingly, some improvement would be necessary for the front side frame in order to properly decrease the collision load against passengers.

SUMMARY OF THE INVENTION

An object of the present invention is to provide a front vehicle-body structure of a vehicle which can properly promote bending of the front side frame at its bending portion when the collision load acts in the vehicle frontal collision so that the collision load against passengers can be decreased securely.

According to the present invention, there is provided a front vehicle-body structure of a vehicle, comprising a dash panel partitioning a vehicle room from an engine room at a front vehicle body, a front side frame connected to a front side of the dash panel and extending in a vehicle longitudinal direction, part of which is deformed so as to bend outwardly, in a vehicle width direction, by a collision load in a vehicle frontal collision, a sub frame provided at a lower portion of the front vehicle body and joined to the front side frame, and a reinforcement provided at the front side frame, wherein the sub frame is joined to the front side frame via the reinforcement, and a front portion of the reinforcement is located at a position which corresponds to a bending portion of the front side frame which is to be deformed so as to bend outwardly, in the vehicle width direction, by the collision load in the vehicle frontal collision.

According to the present invention, a properly large difference in the rigidity between the above-described bending portion and a reinforced portion of the front side frame with the above-described reinforcement can be provided. Thereby, the bending deformation of the front side frame at its bending portion can be provided securely when the collision load acts on the front side frame. That is, the front portion of the reinforcement can be used as a point causing the above-described bending deformation, so that the bending of the front side frame at its bending portion can be promoted. Consequently, the collision load against passengers can be decreased securely.

According to an embodiment of the present invention, a concave bead which is concaved outwardly, in the vehicle width direction, is formed at the bending portion of an inward side wall of the front side frame so as to extend vertically. Thereby, the above-described bending deformation of the front side frame at the bending portion can be further promoted by cooperation of the concave bead and the reinforcement.

According to another embodiment of the present invention, the front side frame is configured so that a second bending portion thereof which is located in back of the bending portion bending outwardly and in front of a connection portion thereof to the dash panel is deformed so as to bend, in the vehicle width direction, by the collision load in the vehicle frontal collision, and a rear portion of the reinforcement is located at another position which corresponds to the second bending portion. Thereby, a properly large difference in the rigidity between the above-described second bending portion and the reinforced portion of the front side frame with the above-described reinforcement can be provided. Accordingly, the bending deformation of the front side frame at the second bending portion can be provided securely when the collision load acts on the front side frame.

According to another embodiment of the present invention, a concave bead which is concaved inwardly, in the vehicle width direction, is formed at the second bending portion of an outward side wall of the front side frame so as to extend vertically. Thereby, the bending deformation of the front side frame at the second bending portion can be further promoted by cooperation of this concave bead and the reinforcement.

According to another embodiment of the present invention, the front side frame has a closed cross section which extends in the vehicle longitudinal direction, and the reinforcement is arranged inside the closed cross section. Thereby, the reinforcement can be arranged compactly by using a dead space in the above-described closed cross section. Further, the support rigidity of the reinforcement can be increased by using a high rigidity of the closed cross section, so that the more large difference in the rigidity between the above-described bending portion and the reinforced portion of the front side frame with the reinforcement can be provided. Thereby, the above-described bending deformations can be further promoted.

According to another embodiment of the present invention, a suspension tower is joined to the front side frame, the bending portion of the front side frame is provided in front of a joint portion of the front side frame to the suspension tower, and the sub frame is joined via the reinforcement to a specified position of the front side frame near the joint portion. Generally, the suspension tower is formed so as to protrude inwardly (toward an engine room), and a valley portion is formed at a border portion between a front flat-face portion and a protruding curve portion which are formed at the suspension tower. Herein, according to the above-described embodiment, the above-described valley portion can be used as a point causing the bending deformation of the front side frame at its bending portion. Thereby, the bending deformation of the front side frame at the bending portion can be further promoted by cooperation of the reinforcement and the above-described boarder portion.

According to another embodiment of the present invention, a branch frame is provided so as to extend upwardly and rearwardly from a front portion thereof which connects to a specified position of the front side frame near the joint portion to the suspension tower and has a rear portion thereof which connects to the dash panel. Thereby, the collision load can be transmitted effectively to a rear part of the vehicle body, and the front portion of the branch frame can be used as the point causing the bending deformation. Accordingly, the bending deformation of the front side frame at its bending portion can be promoted.

According to another embodiment of the present invention, the front side frame has an upper face at an outward upper position thereof, the upper face being formed so as to bend inwardly, in the vehicle width direction, toward an inside of a wheel house, the branch frame is connected to the upper face of the front side frame, and a front portion of the upper face is located at a position which corresponds to the bending portion. Thereby, a front end of the upper face at the outward upper position of the front side frame can be used as a point causing the above-described bending deformation.

According to another embodiment of the present invention, a support member to support an engine mount is provided at the front side frame at a specified position in front of the bending portion. Thereby, a rear portion of the support member having a high rigidity can be a point causing the above-described bending deformation.

According to another embodiment of the present invention, an apron reinforcement which extends in the vehicle width direction is provided above the front side frame, and a reinforcing member is provided so as to connect a rear portion of the support member and the apron reinforcement. Thereby, a rear portion of the reinforcing member can be a point causing the above-described bending deformation.

Other features, aspects, and advantages of the present invention will become apparent from the following description which refers to the accompanying drawings.

BRIEF DESCRIPTION OF THE DRAWINGS

FIG. 11A is a diagram explaining a state of a right-side front side frame before a vehicle frontal collision,
FIG. 11B is a diagram explaining a move of the right-side front side frame at an initial stage of the vehicle frontal collision,
and FIG. 11C is a diagram explaining a move of the right-side front side frame at a late stage of the vehicle frontal collision.

DETAILED DESCRIPTION OF THE INVENTION

Hereinafter, preferred embodiments of the present invention will be described referring to the accompanying drawings.

Embodiment 1

Figure 1:
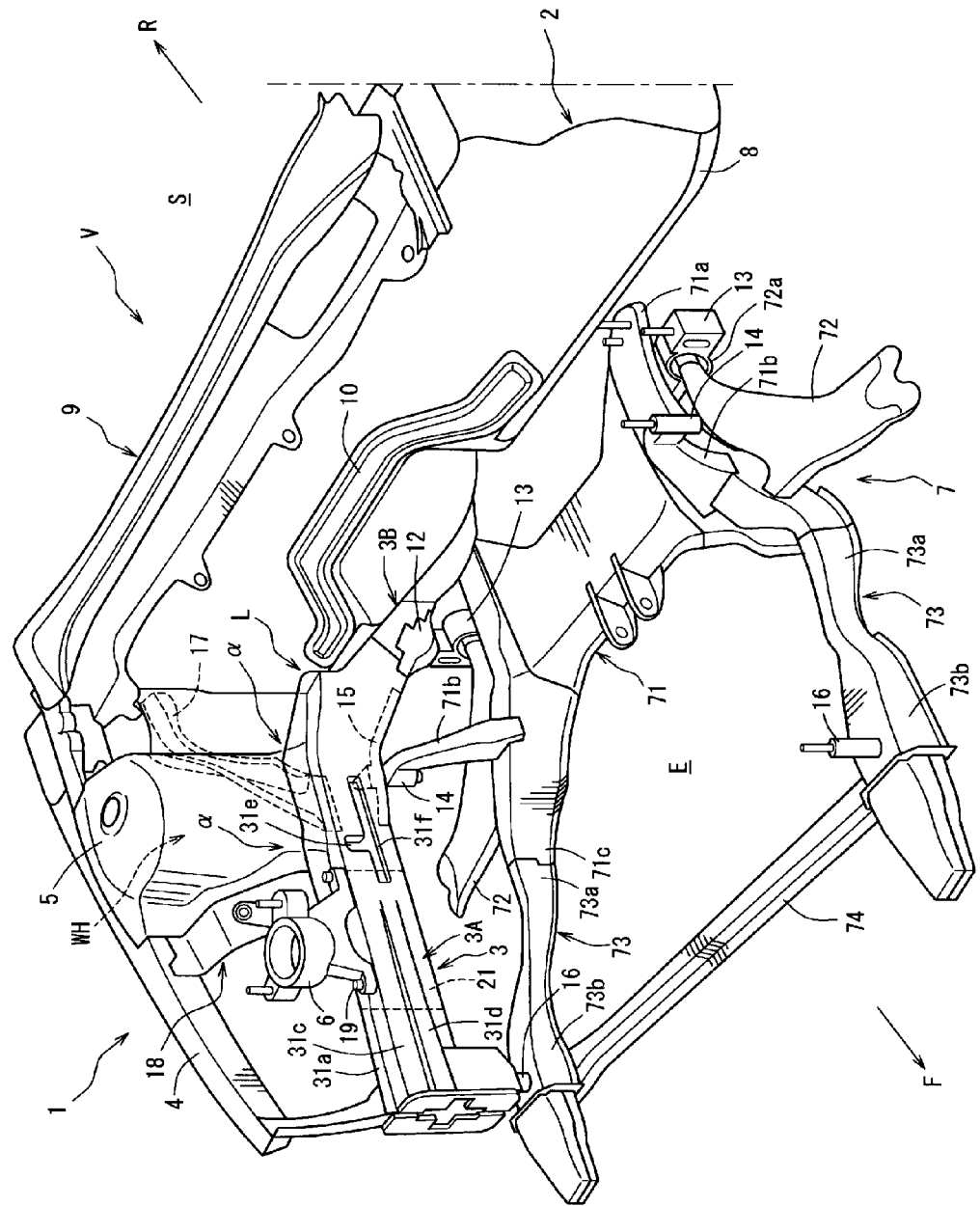
FIG. 1 is a perspective view of a front vehicle-body structure of a vehicle according to a first embodiment of the present invention, when viewed from above and front.
Figure 2:
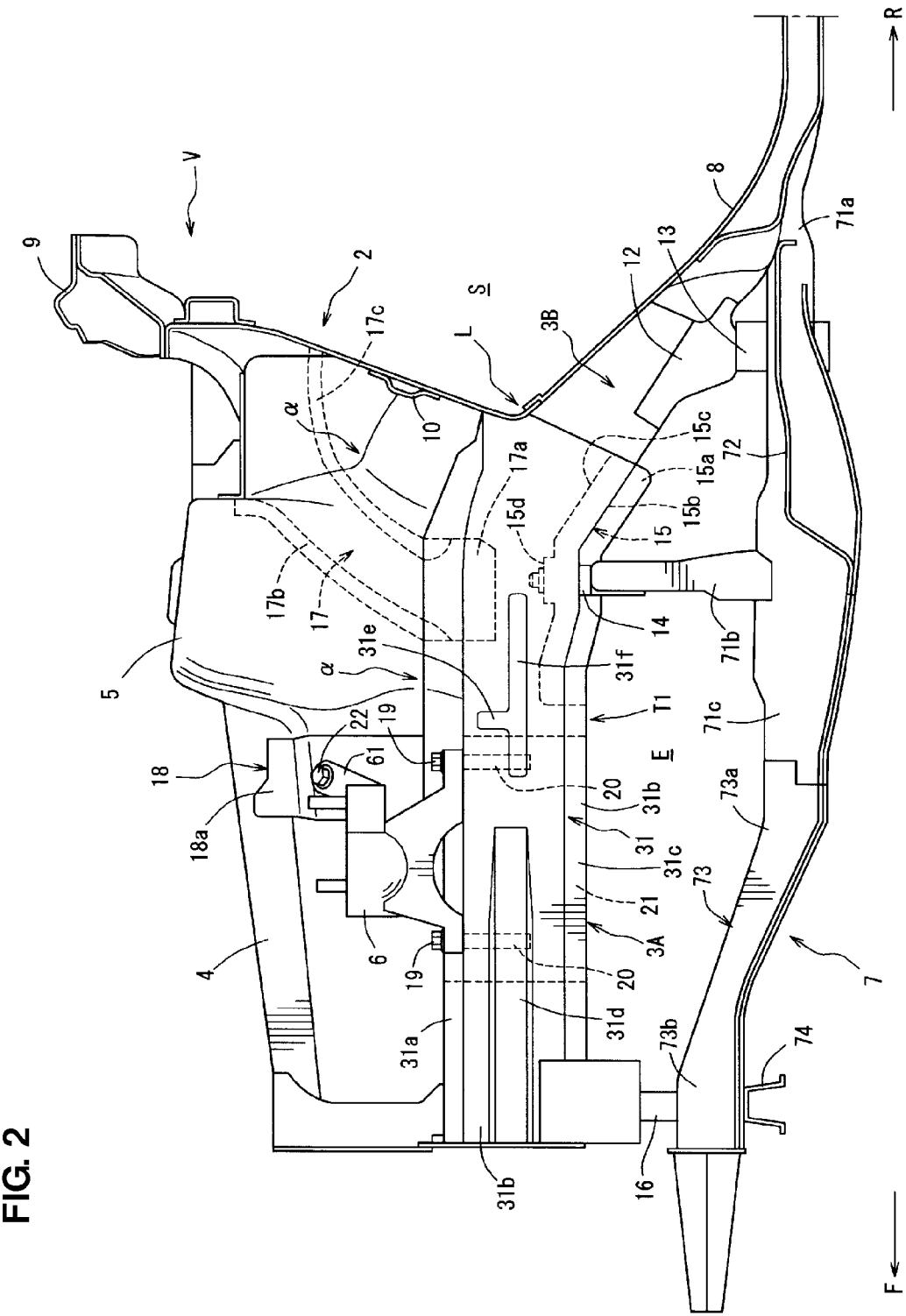
FIG. 2 is a side view of the front vehicle-body structure of a vehicle, when viewed outwardly from the inside of the vehicle.
Figure 3:
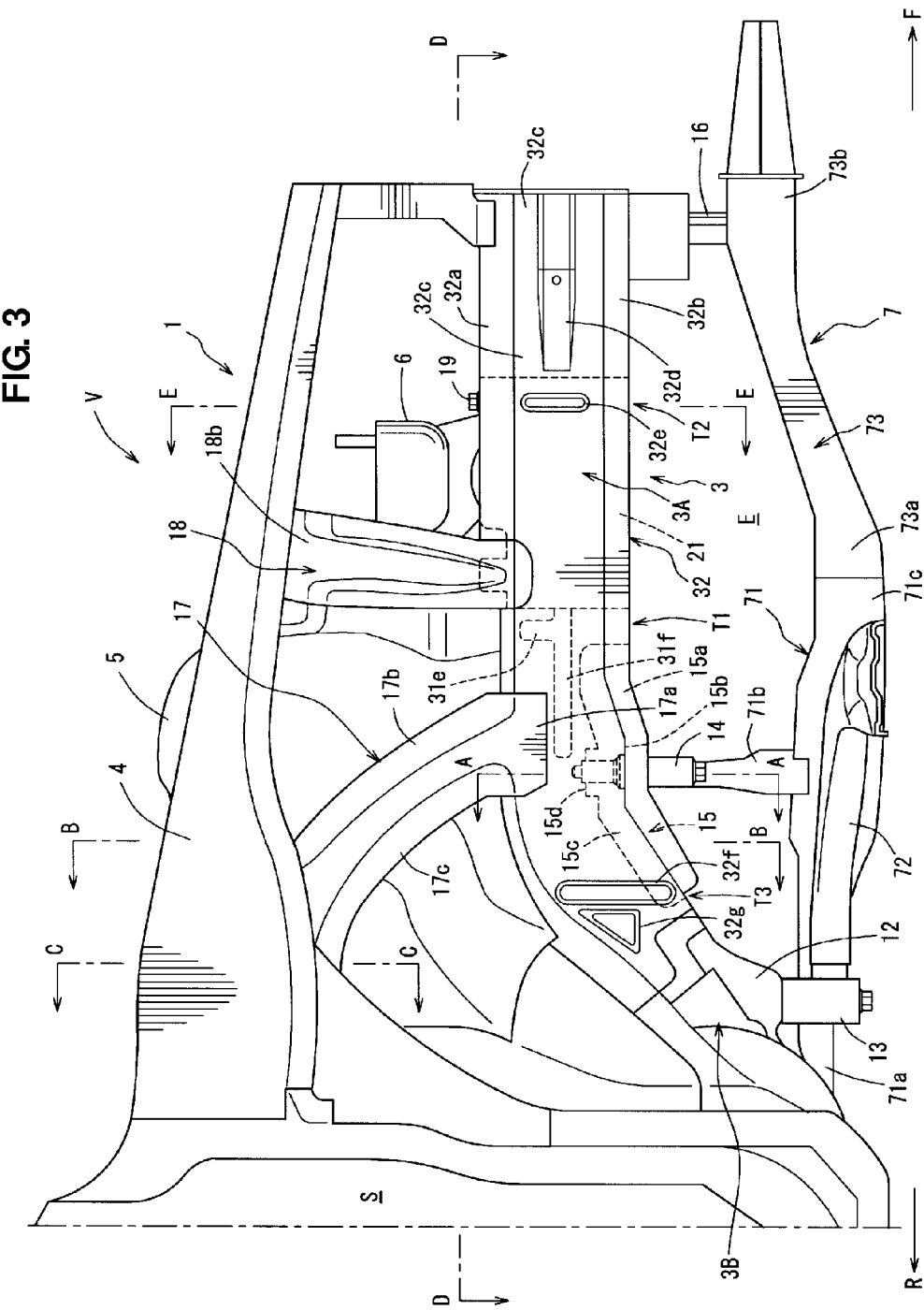
FIG. 3 is a side view of the front vehicle-body structure of a vehicle, when viewed inwardly from the outside of the vehicle.

FIG. 1 is a perspective view of a front vehicle-body structure of a vehicle according to a first embodiment of the present invention, when viewed from above and front. FIGS. 2 and 3 are side views of the front vehicle-body structure of a vehicle (FIG. 2 is a side view, when viewed outwardly from the inside of the vehicle, and FIG. 3 is a side view, when viewed inwardly from the outside of the vehicle). Herein, in the figures, an arrow (F) shows a vehicle front direction, an arrow (R) shows a vehicle rear direction, an arrow (IN) shows a vehicle inward direction, and an arrow (OUT) shows a vehicle outward direction.

A front vehicle body 1 of a vehicle V comprises, as shown in FIGS. 1 and 2, a dash panel 2 which partitions a vehicle room S from an engine room E in a vehicle longitudinal direction at a front of the vehicle body 1, a pair of front side frames 3 which is connected to a front side of the dash panel 2 and extends in the vehicle longitudinal direction, a pair of apron reinforcements 4 which is arranged outwardly and above the pair of front side frames 3, a pair of cylindrical suspension towers 5 which is arranged near the dash panel 2 between the front side frames 3 and the apron reinforcements 4, engine mounts 6 which support an engine unit, not illustrated, which comprises an engine, a transmission and others, and so on. Herein, illustrations of left-side parts of the front side frames 3, apron reinforcements 4 and others are omitted just for simplicity in FIGS. 1 and 2.

The suspension tower 5 protrudes toward the vehicle inside (engine room E), which forms a wheel house WH to provide a space on the vehicle outside for a front wheel, not illustrated. A valley portion is formed at a border portion a (see FIG. 1) between a flat-face portion which is formed at a front portion of the suspension tower 5 along the front side frame 3 and a curve portion which protrudes so as to curve inwardly at a rear portion of the suspension tower 5.

To the front vehicle body 1 is attached to a sub frame 7 which comprises a suspension cross member 71 which is arranged on a lower side of the engine room E, a pair of suspension arms 72 which is arranged on both sides of the suspension cross member 71, a pair of engine support members 73 which extends longitudinally, a front cross member 74 which connects both front end portions of the engine support members 73, and so on.

The dash panel 2 is made of a steel plate which is relatively thin and has a relatively low rigidity, compared with the front side frame 3. The dash panel 2 is joined to a front end portion of a floor panel 8 at its lower end portion. Meanwhile, an upper end portion of the dash panel 2 is joined to a cowl portion 9 which extends in a vehicle width direction, and both end portions of the dash panel 2 are joined to front hinge pillars (not illustrated) which support front doors (not illustrated).

A dash cross member 10 which extends in the vehicle width direction and has a U-shaped cross section is provided at a front face of the dash panel 2 on the side of engine room E. The dash cross member 10 forms a closed cross section together with the dash panel 2, which increases the rigidity of the dash panel 2. Both side end portions of the dash cross member 10 are joined to respective joint portions L of the front side frame 3 to the dash panel 2, which will be described later, which increases the rigidity of the front side frame 3.

As shown in FIG. 2, the above-described front side frames 3 extend in the vehicle longitudinal direction at right and left sides of the engine room E in front of the dash panel 2 partitioning the vehicle room S. That is, the front side frames 3 extend substantially horizontally from the front portion toward the rear portion of the vehicle V, midway portions at their rear end portions are joined to upper portions of the dash panel 2, and their rear end portions extend so as to slant downwardly along a lower end portion of the dash panel 2 and a lower face of the floor panel 8 and are joined. The rear end portions of the front side frames 3 are joined to the dash panel 2 at the joint portions L.

The front side frame 3 comprises a front frame 3A which has a closed cross section and a rear frame 3B which forms a closed cross section together with the dash panel 2 and the floor panel 8. A rear end of the front frame 3A is joined to the dash panel 2 by spot welding. The rear frame 3B is joined to the dash panel 2 and the floor panel 8, and a rear end of the front frame 3A is joined to a front end portion of the rear frame 3B.

Figure 4:
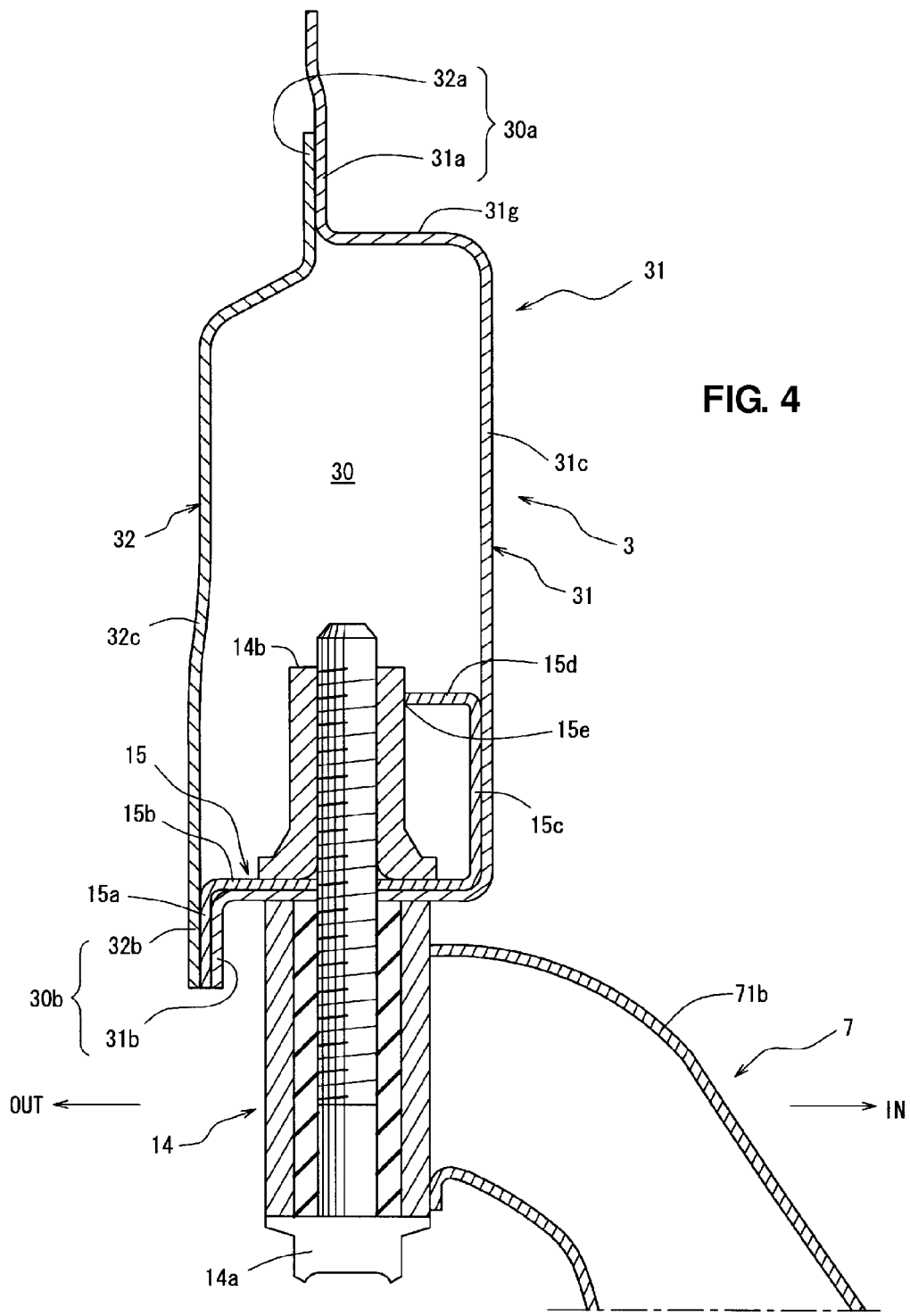
FIG. 4 is a sectional view taken along line A-A of FIG. 3.

FIG. 4 is a sectional view taken along line A-A of FIG. 3. As shown in FIG. 4, the front frame 3A is comprised of an inner panel 31 provided on the inward side and an outer panel 32 provided on the outward side which form a closed cross section 30 which extends in the vehicle longitudinal direction. The inner panel 31 is, as shown in FIGS. 1, 2 and 4, comprised of an inner upper flange 31a positioned on an upper side, an inner lower flange 31b positioned on a lower side, and an inner panel body 31c which is positioned between these flanges 31a, 31b as an outward side wall. Likewise, the outer panel 32 is, as shown in FIGS. 3 and 4, made of a flat steel press plate and comprised of an outer upper flange 32a positioned on an upper side, an outer lower flange 32b positioned on a lower side, and an outer panel body 32c which is positioned between these flanges 32a, 32b as an inward side wall.

As shown in FIG. 4, the inner upper flange 31a and the outer upper flange 32a are joined by spot welding, and the inner lower flange 31b and the outer lower flange 32b are joined by spot welding. Thus, an upper joint flange 30a and a lower joint flange 30b are formed at the front frame 3A. The lower joint flange 30b is formed over a range from a front end of the front frame 3A to a position near the joint portion L, and the inner panel body 31c and the outer panel body 32c are formed so as to extend over a range from a rear end portion of the lower joint flange 30b to the lower end portion of the dash panel 2.

At the inner panel 31 are formed, through a press forming, an inner convex portion 31d which extends substantially straightly in the vehicle longitudinal direction, a first inner bead 31e which extends vertically, and a second inner bead 31f which extends substantially straightly in the vehicle longitudinal direction as shown in FIG. 2.

The inner convex portion 31d is formed at a middle position, in the vertical direction, of the inner panel body 31c so as to extend over a range front a front end to a middle portion, in the vehicle longitudinal direction, of the inner panel body 31c. The inner convex portion 31d projects inwardly, and its projecting height becomes smaller gradually toward the vehicle rear. Thus, the inner convex portion 31d extends rearwardly from a first outer bead 32e, so that the rigidity of the inner panel 31 which corresponds to the position of the first outer bead 32e is set to be higher than that of the outer panel 32 which corresponds to the position of the first outer bead 32e.

The first inner bead 31e which extends vertically and has a V-shaped cross section is a concave bead which is formed so as to project outwardly at a specified position behind a rear end of the inner convex portion 31d, and it is configured to be continuous from an upper portion of the inner panel body 31c to a rear portion of the second inner bead 31f.

The first inner bead 31e is positioned between the first outer beads 32e and a second outer bead 32f. Herein, the bead depth and bead width of the first inner bead 31e are set so that the inner panel 31 bends outwardly (i.e., in a reverse-V shape) at the first inner bead 31e in the vehicle frontal collision as shown in FIGS. 11B, 11C. Thus, a bending portion T1, which is to bend outwardly (in the reverse-V shape) in the vehicle frontal collision, is formed at the position of the first inner bead 31e of the inner panel 31. This bending portion T1 is provided in front of a joint portion of the front side frame 3 to the suspension tower 5.

The above-described second inner bead 31f which has a groove-shaped cross section is formed in back of an outer convex portion 32d. The second inner bead 31f is a concave bead which projects outwardly.

The outer panel 32 has, as shown in FIG. 3, the outer convex portion 32d which extends substantially straightly in the vehicle longitudinal direction, the first outer beads 32e which extends vertically, the second outer bead 32f which extends vertically at a specified position near the joint portion L of the front side frame 3 to the dash panel 2, a deformation promotion portion 32g which is formed behind the second outer bead 32f, which will be described below, etc., through press forming.

The outer convex portion 32d is formed at a middle position, in the vertical direction, of the outer panel body 32c so as to extend over a range front a front end to a middle portion, in the vehicle longitudinal direction, of the outer panel body 32c. The outer convex portion 32d projects outwardly, and its projecting height becomes smaller gradually toward the vehicle rear.

The front side frame 3 has a cross-shaped opening at the front end of the front frame 3A which is formed by the above-described outer convex portion 32d and inner convex portion 31d. A crush can (not illustrated) which is to be fixed to the front end of the front side frame 3 has an attachment portion which is also formed in a cross shape. Thus, the attachment portion of this crush can is attached to the front end of the front side frame 3.

The first outer bead 32e has a half-circular cross section which extends vertically. The first outer bead 32e is a concave portion which is formed in back of a rear end of the outer convex portion 32d so as to project inwardly. The vertical length of this first outer bead 32e is longer than that of the outer convex portion 32d but shorter than that of the outer panel body 32c. Herein, the bead depth, bead width and bead vertical length of the first outer bead 32e are set so that the outer panel 32 bends in a V shape at this first outer bead 32e in the vehicle frontal collision as shown in FIGS. 11B, 11c. Thus, a bending portion T2, which is to bend in the V shape in the vehicle frontal collision, is formed at the position of the first outer bead 32e of the outer panel 32.

Further, the second outer bead 32f has a half-circular cross section which extends vertically. The second outer bead 32f is a concave portion which is formed in front of the above-described joint portion L at a position corresponding to a rear end portion of the lower joint flange 32b so as to project inwardly. This second outer bread 32f extends over a range from an upper end portion to a lower end portion of the outer panel body 32c. Herein, the bead depth and bead width of the second outer bead 32f are set so that the outer panel 32 bends in a V shape at this second outer bead 32f in the vehicle frontal collision as shown in FIGS. 11B, 11c. Thus, a bending portion T3, which is to bend in the V shape in the vehicle frontal collision, is formed at the position of the second outer bead 32f of the outer panel 32.

As shown in FIG. 3, the deformation promotion portion 32g which is formed in a triangular shape in a side view is a convex portion which projects outwardly between the second outer bead 31f and the joint portion L, and one side of the triangular shape of the deformation promotion portion 32g is almost in parallel to the second outer bead 32f.

The area of the closed cross section of the front frame 3A in front of the second outer bead 32f is set to be greater than that of the front frame 3A at a specified position where the second outer bead 32f is formed, and the area of the closed cross section of the front frame 3A where the deformation promotion portion 32g is formed is set to be further greater than that of the front frame 3A in front of the second outer bead 32f. Thus, the rigidity of the front frame 3A where the deformation promotion portion 32g is formed can be greater than that of the front frame 3A where the second outer bead 32f is formed.

Meanwhile, the suspension cross member 71 extending in the vehicle width direction of the sub frame 7 shown in FIGS. 1 through 4 comprises a pair of cross member attachment face portions 71a which are formed at its both-side rear end portions, a pair of cross member attachment portions 71b which extend outwardly from its middle portions, and a pair of engine support attachment portion 71c which are formed at its both-side front end portions.

The pair of cross member attachment face portions 71a is connected to a pair of gussets 12 which is located below the dash panel 2 via a pair of first rubber bushes 13 with bolts. The gusset 12, which is of a wedge shape in the side view, is joined to a front end portion of a rear frame panel (not illustrated) which is joined to respective rear end portions of the inner panel body 31c and the outer panel body 32c.

Figure 5:
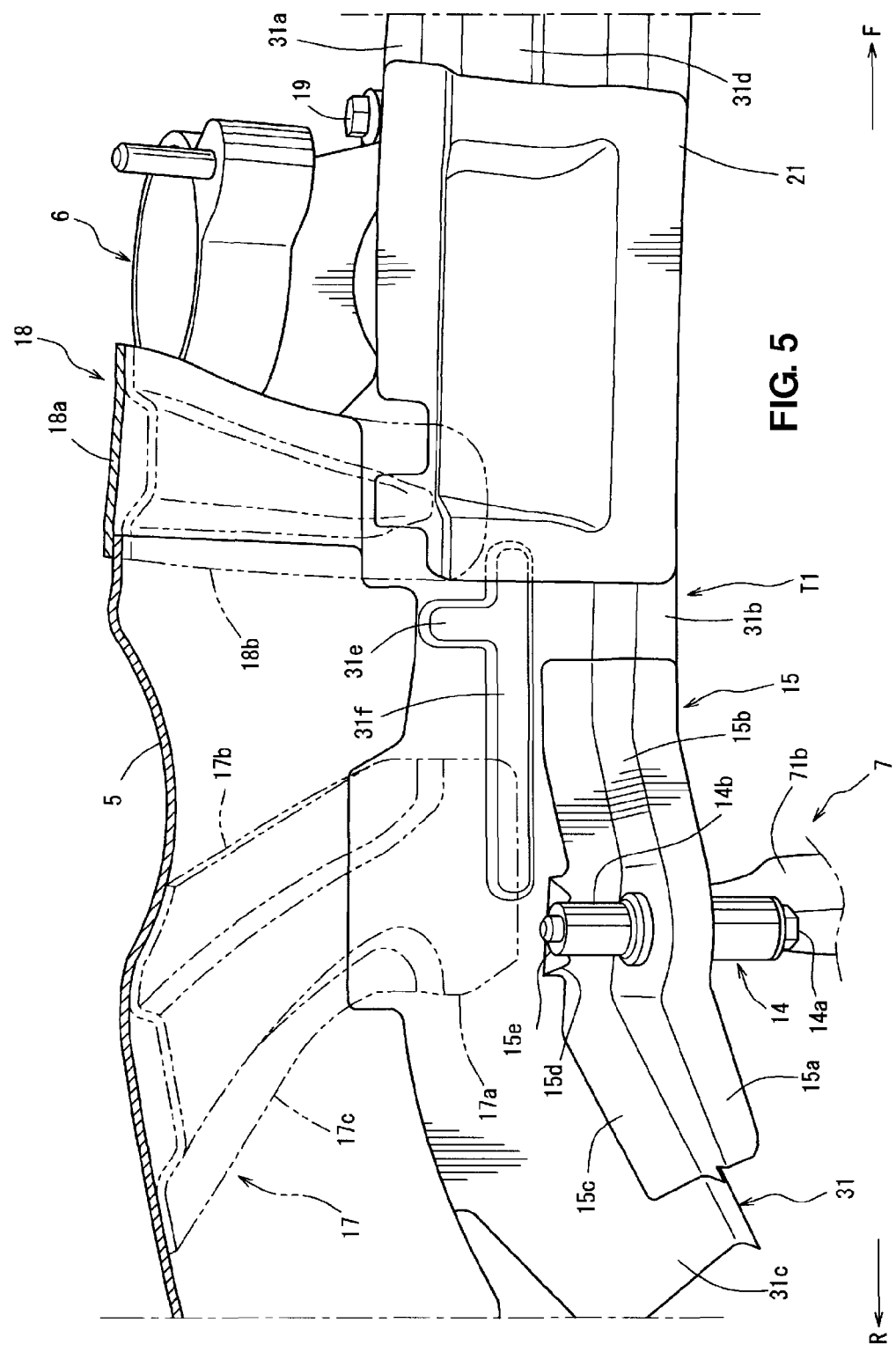
FIG. 5 is a perspective view of a major part of the front vehicle-body structure of a vehicle, which shows a state in which an outer panel of a front side frame is removed.
Figure 6:
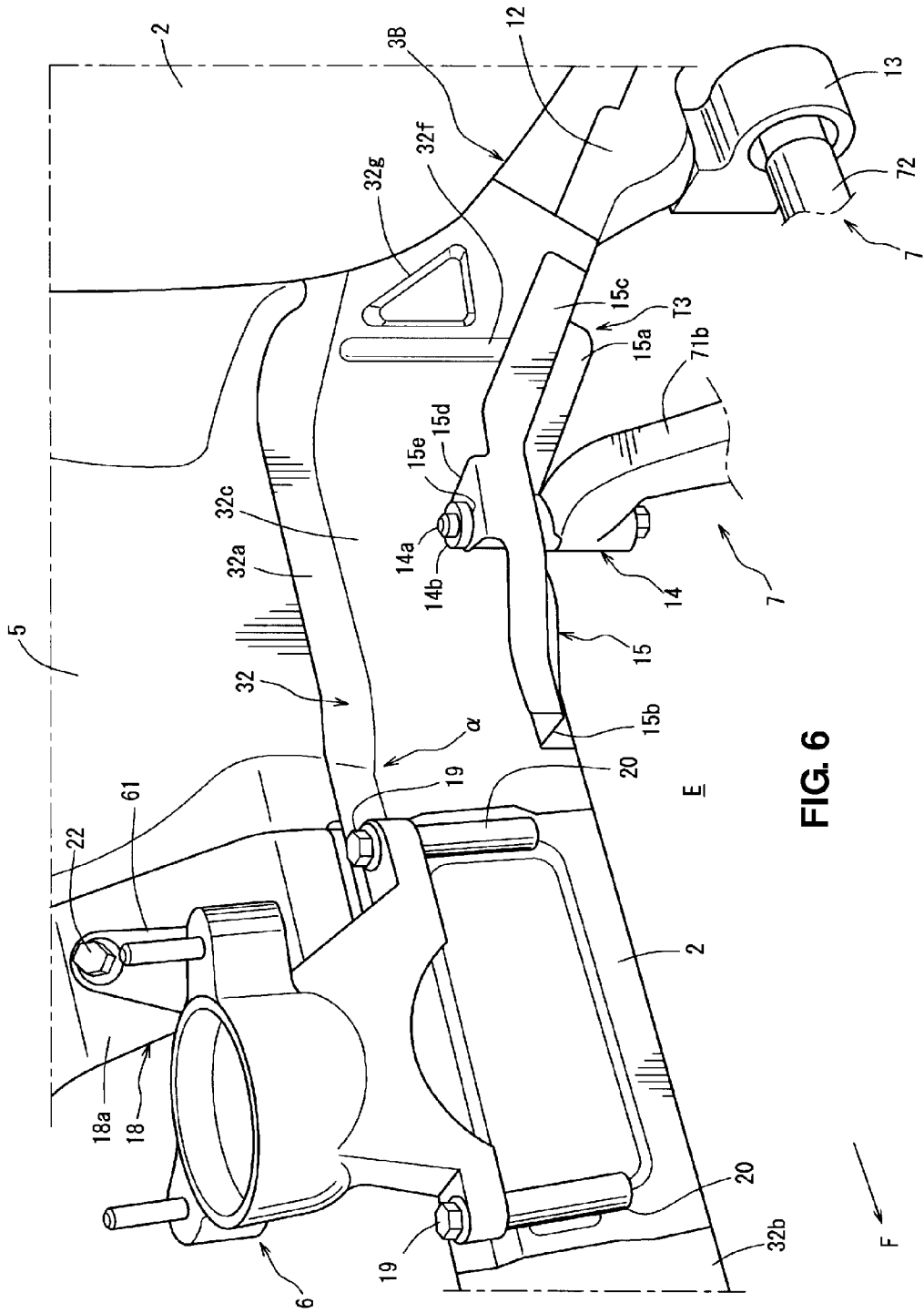
FIG. 6 is a perspective view of the major part of the front vehicle-body structure of a vehicle, which shows a state in which an inner panel of the front side frame is removed.

Each of the pair of cross member attachment portions 71b is connected to a specified position of a lower end face of the front frame 3A which corresponds to the suspension tower 5 via a second rubber bush 14 (suspension sub frame attachment portion) with a bolt 14a and a nut 14b shown in FIGS. 4 through 6.

FIG. 5 is a perspective view of a major part of the front vehicle body 1, which shows a state in which the outer panel 32 of the front side frame 3 is removed. FIG. 6 is a perspective view of the major part of the front vehicle body 1, which shows a state in which the inner panel 31 of the front side frame 3 is removed. As shown in FIGS. 4 through 6, a reinforcement 15 which has a Z-shaped cross section is arranged inside the closed cross section 30 of the front side frame 3, and joined to the inner panel 31 and the outer panel 32. The cross member attachment portion 71b is joined near the joint portion of the front side frame 3 and the suspension tower 5 by the reinforcement 15.

A specified portion of the inner panel 31 where the reinforcement 15 is provided is reinforced with the reinforcement 15, and the above-described second rubber bush 14 is connected to the above-described specified portion of the inner panel 31 which is reinforced with the reinforcement 15.

The reinforcement 15 which extends longitudinally comprises, as shown in FIGS. 4 through 6, a first vertical plate portion 15a which contacts the inner lower flange 31b via face contact, a horizontal plate portion 15b which contacts a lower end face of the inner panel body 31c via face contact, a second vertical plate portion 15c which contacts an outward side wall of the inner panel body 31c via face contact, and a joint support piece 15d which extends outwardly from an upper end portion of the second vertical plate portion 15c.

As shown in FIGS. 1 through 3 and 5, a front portion of the reinforcement 15, specifically the first vertical plate portion 15a, the horizontal plate portion 15b, and a front end portion of the second vertical plate portion 15c are provided at a position which corresponds to the first inner bead 31e. Meanwhile, as shown in FIGS. 3 and 6, a rear portion of the reinforcement 15, specifically a rear end portion of the first vertical plate portion 15a is provided at a position which substantially corresponds to a rear end portion of the lower joint flange 30b right behind the second outer bead 32f.

Further, a half-circular notch 15e is formed at a free end of the joint support piece 15d of the reinforcement 15 as shown in FIGS. 5 and 6. A nut 14b of the second rubber bush 14 is applied and fixed to the notch 15e by welding or the like. Thus, the nut 14b, i.e., the second rubber bush 14 is supported at the joint support piece 15d of the reinforcement 15.

A rear end portion of the second vertical plate portion 15c extends to a specified position, in the vehicle longitudinal direction, which corresponds to the deformation promotion portion 32g as shown in FIG. 6. Thus, the reinforcement 15 increases the rigidity of a specified position of the inner panel 31 which corresponds to the second outer bead 32f, ensuring the support rigidity of the second rubber bush 14. That is, the rigidity of the inner panel 31 is increased more than that of the outer panel 32 at the specified position corresponding to the second outer bead 32f, so that the V-shaped bending deformation of the front side frame 3 can be restrained and the outward bending deformation of that can be promoted.

As shown in FIG. 1, a rear portion of the suspension arm 72 is connected to the suspension cross member 71 via a support bracket 72a, and a front portion of the suspension arm 72 is connected to a front portion of the suspension cross member 71 via a rubber mount (not illustrated).

As shown in FIGS. 1 through 3, the both-side engine support members 73 extend in the vehicle longitudinal direction at the both sides of the engine room E for supporting the engine (not illustrated), and their rear end portions 73a are connected to the engine support member attachment portions 71c at the front end of the suspension cross member 71. Respective front end portions 73b of the engine support members 73 are connected to the front ends of the front side frames 3 via respective rubber mounts 16. The front cross member 74 is provided so as to extend between the front end portions 73b of the engine support members 73, and both-side ends of the front cross member 74 are fixed to the rubber mounts 16 via the engine support members 73.

Figure 7:
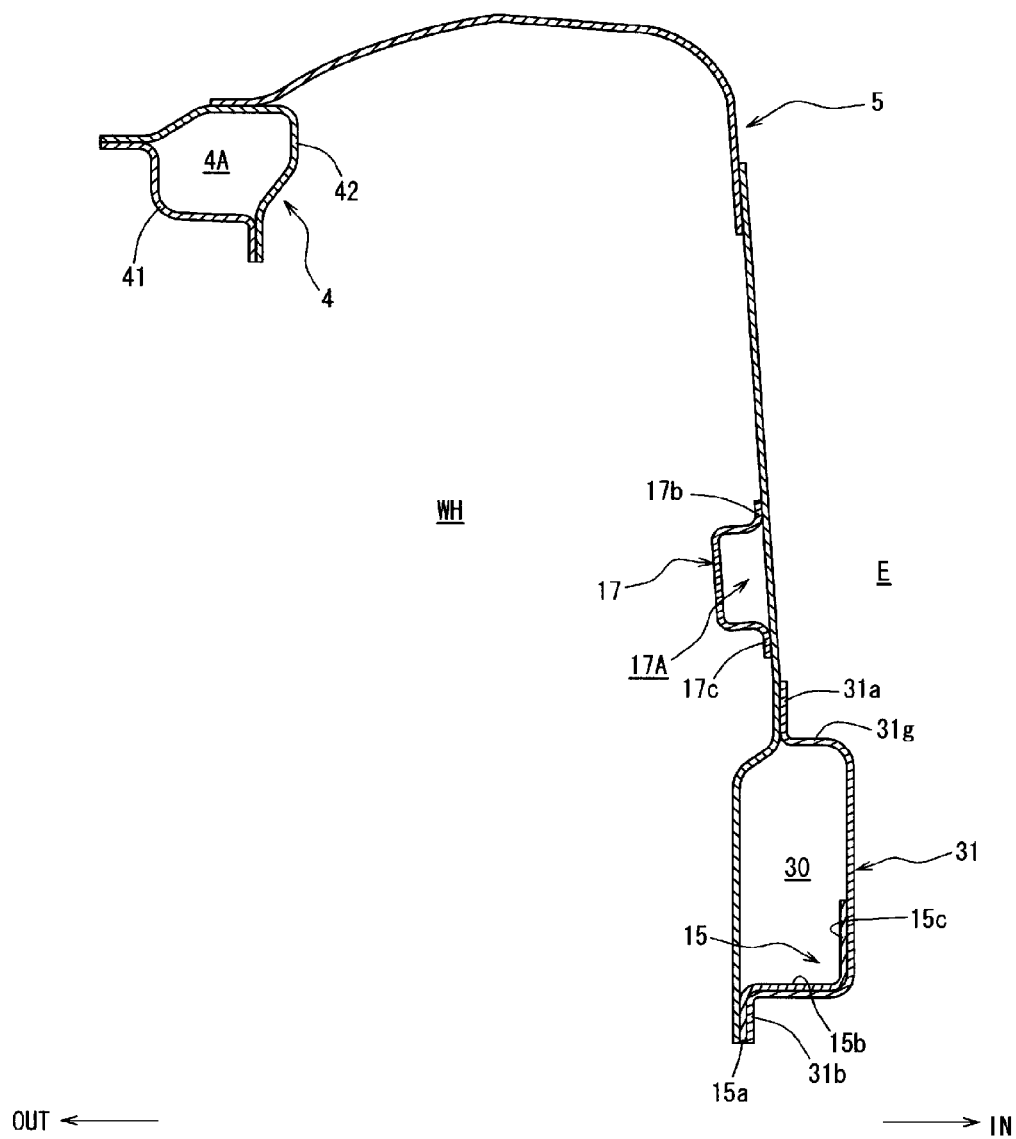
FIG. 7 is a sectional view taken along line B-B of FIG. 3.
Figure 8:
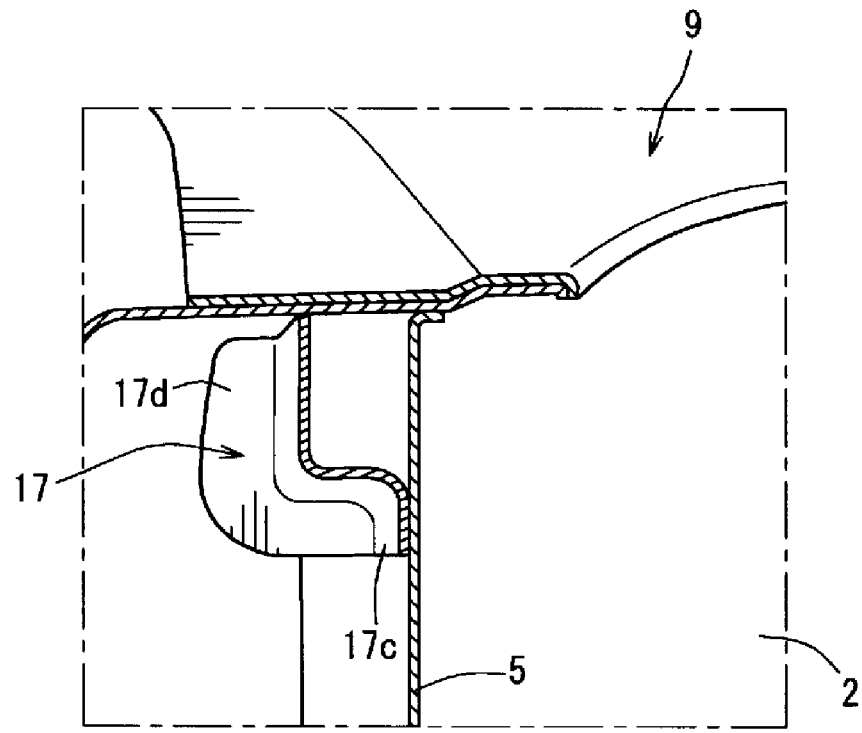
FIG. 8 is a sectional view taken along line C-C of FIG. 3.
Figure 9:
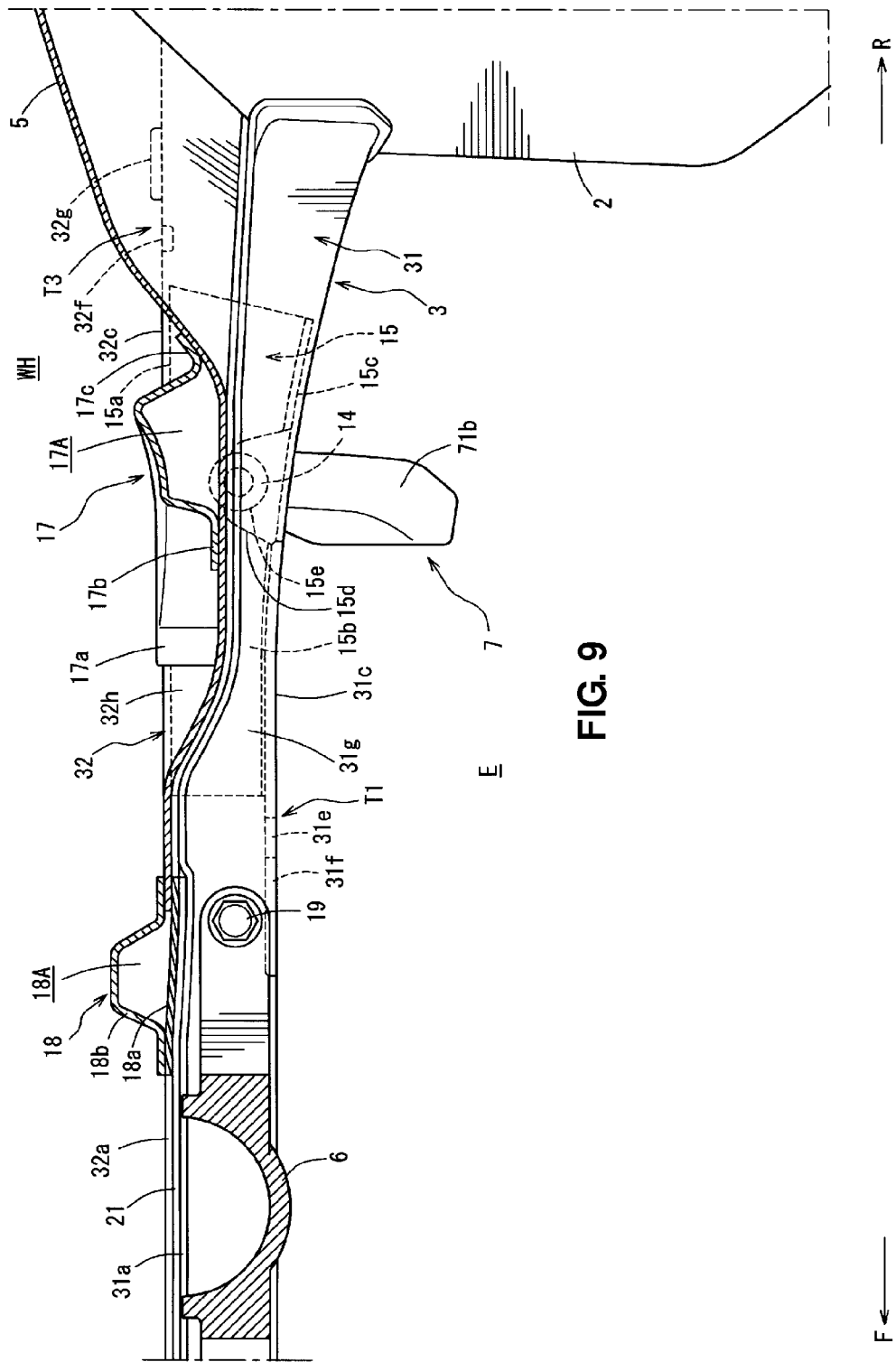
FIG. 9 is a sectional view taken along line D-D of FIG. 3.

FIGS. 7 through 9 are sectional views taken along line B-B, C-C and D-D of FIG. 3, respectively. In the present embodiment, as shown in FIGS. 1 through 3, 5 and 7 through 9, a branch frame 17 is provided so as to extend upwardly and rearwardly from a specified position near the joint portion of the front side frame to the suspension tower 5 and connect the front side frame 3 and an upper portion of the dash panel 2.

This branch frame 17 is arranged on the outward side of a side face portion of the suspension tower 5, and it has a U-shaped cross section at the B-B section of FIG. 3 as shown in FIG. 7 and an L-shaped cross section at the C-C section of FIG. 3 as shown in FIG. 8. The branch frame 17 comprises, as shown in FIGS. 3, 5 and 7 through 9, a lower end flange 17a which is joined to the front side frame 3, a middle upper flange 17b and a middle lower flange 17c which are integrally formed with an upper position and a lower position of a middle portion, in the vehicle longitudinal direction, of the branch frame 17, and a rear end flange 17d which is joined to the dash panel 2.

The above-described branch frame 17 is joined to the outward position of the side face of the suspension tower 5 so as to form a closed cross section 17A (see FIGS. 7 and 9) which extends longitudinally and vertically. That is, at the position of B-B section shown in FIG. 3, the middle upper flange 17b and the middle lower flange 17c are joined to the outward face of the side face portion of the suspension so as to form the closed cross section 17A. Meanwhile, at the position of C-C section shown in FIG. 8 and its rearward position, the middle lower flange 17c is joined to the side face portion of the suspension tower 5, and the rear end flange 17d is joined to the outward position of an upper portion of the dash panel 2.

Further, the front side frame 3 is configured, as shown in FIG. 9, so that the width, in the vehicle width direction, of an upper face portion 31g of the inner panel 31 near the first inner bead 31e becomes gradually narrower toward the vehicle rear. Meanwhile, an upper face portion 32h is formed at the outer panel 32 near the first inner bead 31e so as to correspond to the above-described narrow upper face portion 31g of the inner panel 31. This upper face portion 32g is configured to bend inwardly into the wheel house WH. The above-described branch frame 17 is joined to an upper face portion 32h of the outer panel 32 at its lower end.

Herein, the apron reinforcement 4 which is arranged above the front side frame 3 comprises, as shown in FIG. 7, an apron reinforcement outer 41 and an apron reinforcement inner 42 mainly, and has a closed cross section 4A which extends in the vehicle longitudinal direction as shown in the figure. To this apron reinforcement 4 is connected a reinforcing member 18 which extends vertically in front of the suspension tower 5 as shown in FIGS. 1 through 3 and 9. This reinforcing member 18 comprises an inside panel 18a which has a substantially straight cross section and an outside panel 18b which has a substantially U-shaped cross section, and forms a closed cross section 18A (see FIG. 9). An upper end portion of the reinforcing member 18 is connected to the apron reinforcement 4, and a lower end portion of the reinforcing member 18 is connected to the outer panel body 32c of the outer panel 32 of the front side frame 3.

Meanwhile, the above-described engine mount 6 is fixed to the front side frame 3 and supports the above-described engine unit. Further, part of this engine mount 6 is fixed to the reinforcing member 18 which is connected to the outer panel 32 in front of the suspension tower 5. The engine mount 6 prevents vibrations which may occur at the engine unit from being transmitted directly to the vehicle body with a resilient member, such as rubber, which constitutes the engine mount 6.

Figure 10:
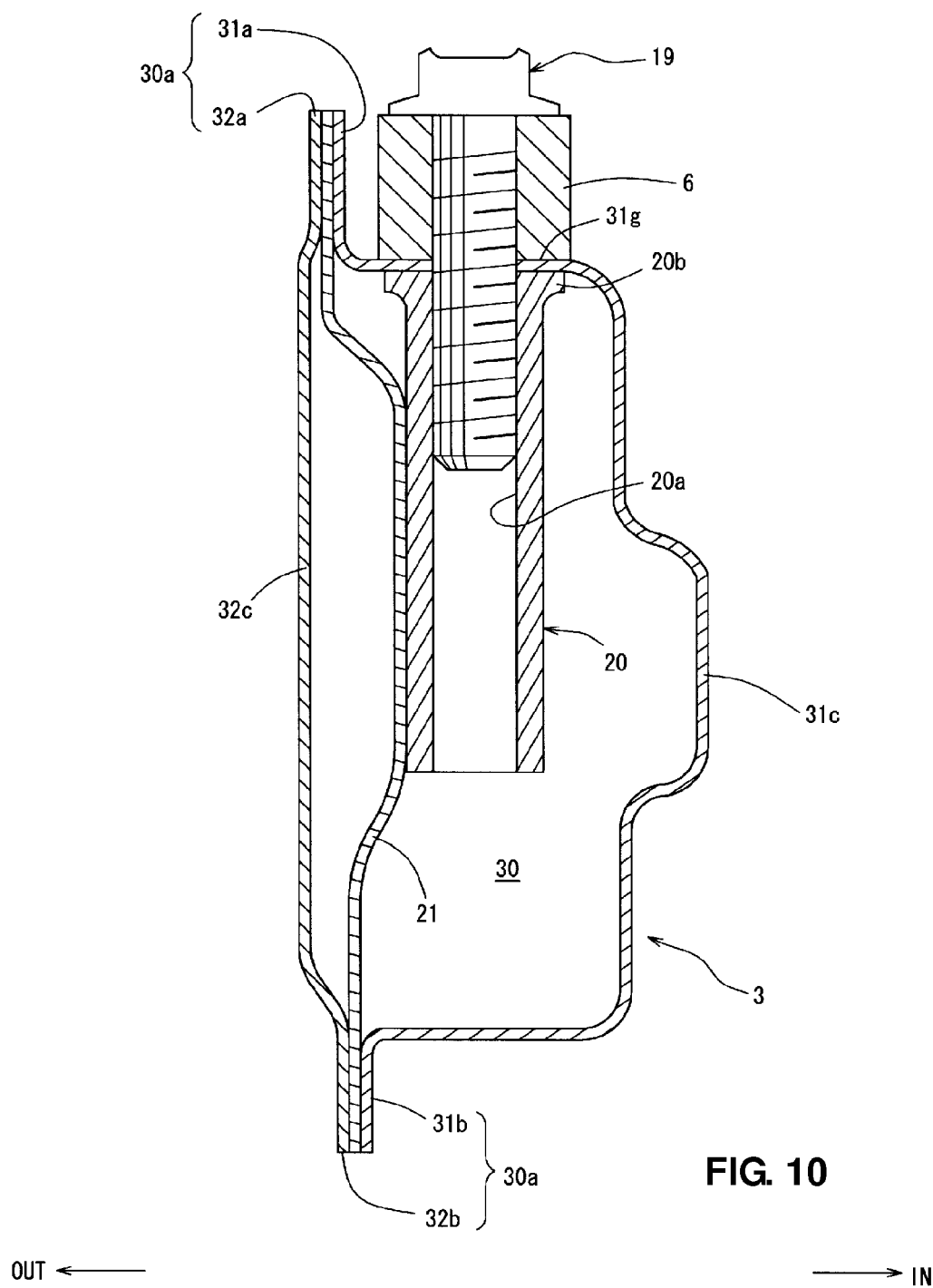
FIG. 10 is a sectional view taken along line E-E of FIG. 3.

FIG. 10 is a sectional view taken along line E-E of FIG. 3. As shown in FIGS. 1 through 3, 5, 6, 9 and 10, the engine mount 6 is fixed to the upper face portion 31g of the inner panel 31 of the front side frame 3 with a bolt 19 extending vertically and a nut portion 20 applied to the bolt 19. The nut portion 20 is a cylindrical member which has a female screw portion 20a at its inner peripheral face as shown in FIG. 10. A flange 20b is formed at an upper end of the nut portion 20, which is joined to an inner wall of the upper face portion 31g of the inner panel 31 by welding or the like.

A plate-shaped support plate 21 is arranged substantially in parallel to the outer panel body 32c on the inward side of the outer panel 32 of the front side frame 3. An upper end portion of this support plate 21 is joined to the outer upper flange 32a and the inner upper flange 31a by welding, whereas a lower end portion of this support plate 21 is joined to the outer lower flange 32b and the inner lower flange 31b by welding, as shown in FIG. 10. An outward side of the nut portion 20 is joined to an inward wall face of the support plate 21 by welding or the like.

The engine mount 6 comprises an arm portion 61 which extends outwardly as shown in FIGS. 2 and 6, and this arm portion 61 is fixed to the inside panel 18a of the reinforcing member 18 with a bolt 22.

Hereinafter, moves of the front side frame in the vehicle frontal collision will be explained referring to FIGS. 11A, 11B and 11C. FIG. 11A is a diagram explaining a state of the front side frame 3 before the vehicle frontal collision, FIG. 11B is a diagram explaining a move of the front side frame 3 at an initial stage of the vehicle frontal collision, and FIG. 11C is a diagram explaining a move of the front side frame 3 at a late stage of the vehicle frontal collision. Herein, the right-side front side frame 3 is shown for convenience of the explanation.

As shown in FIG. 11A, the first outer bead 32e, the first inner bead 31e, and the second outer bead 32f are formed at the outward and inward sides of the front side frame 3 in a zigzag manner in the plan view. Herein, the moves will be described in terms of an area A from the front end portion of the front side frame 3 to the first outer bead 32e, an area B from the first outer bead 32e to the first inner bead 31e, an area C from the first inner bead 31e to the second outer bead 32f, and an area D from the second outer bead 32f to the dash panel 2.

When the vehicle frontal collision occurs, the well-known cylindrical crush can (not illustrated) which is provided at the front end portion of the front side frame 3 is crushed by the collision load. The rest of the collision load which has not been absorbed through the crush of the crush can is inputted from the front end portion of the front side frame 3 and transmitted to the vehicle rear.

As shown in FIG. 11B, the collision load inputted to the front end portion of the front side frame 3 causes crush deformation of the area A. Concurrently, the portion of the first inner bead 31e (bending portion T1), the portion of the first outer bead 32e (bending portion T2), and the portion of the second outer bead 32f (bending portion T3) start bending.

Herein, the first inner bead 31e is the concave portion which is formed at the inner panel 31 so as to be concaved outwardly, the modulus of section of the front side frame 3 at the bending portion T1 which corresponds to the first inner bead 31e is smaller than that of other portions of the front side frame 3 which are located in front or back of the first inner bead 31e, and the rigidity of the outer panel 13 is greater than that of the inner panel 31. Consequently, the bending portion T1 bends outwardly (in the reverse-V shape) in the vehicle width direction as illustrated.

The first outer bead 32e is the concave portion which is formed at the outer panel 32 so as to be concaved inwardly, the modulus of section of the front side frame 3 at the bending portion T2 which corresponds to the first outer bead 32e is smaller than that of other portions of the front side frame 3 which are in located in front or back of the first outer bead 32e, and the rigidity of the inner panel 31 is greater than that of the outer panel 32. Consequently, the bending portion T2 bends in the V shape as illustrated.

Herein, the reinforcement 15 and the branch frame 17 reinforce the front side frame 3 between the first inner bead 31e and the second outer bead 32f. Meanwhile, the reinforcing member 18 and the plate member 22 which support the engine mount 6 reinforce the front side frame 3 between the first outer bead 32e and the first inner bead 31e.

The second outer bead 32f is the concave portion which is formed at the outer panel 32 so as to be concaved inwardly, the modulus of section of the front side frame 3 at the bending portion T3 which corresponds to the second outer bead 32f is small, and the portion of the second outer bead 32f (the bending portion T3) is reinforced by the deformation promotion portion 32g. Consequently, the bending portion T2 bends in the V shape as illustrated.

As the collision progresses further, as shown in FIG. 11C, the front side frame 3 bends at the respective beads 32e, 31e, 32f in a zigzag manner, so that the front side frame 3 bends outwardly greatly at the bending portion T1 corresponding to the first inner bead 31e. Thus, a large degree of collision energy can be absorbed by the zigzag bending deformation of the front side frame 3. Accordingly, the dash panel 2 can be restrained from getting back, so that the proper space of the vehicle room can be ensured even in the vehicle collision.

The deformation promotion portion 32g reinforces the outer panel 32 in back of the second outer bead 32f in the area D so as to promote the bending at the second outer bead 32f. The reinforcement 15 and the branch frame 17 reinforce the front side frame 3 between the first inner bead 31e and the second outer bead 32f so as to restrain bending deformation of its midway portion in the area C. Further, the reinforcing member 18 and the support plate 21 reinforce the front side frame 3 between the first inner bead 31e and the first outer bead 32e so as to restrain bending deformation of its midway portion in the area B.

Herein, in case the collision load is so large that the second outer bead 32f bends greatly and thereby the area C moves outwardly greatly, a sufficiently-large space for this moving of the area C is ensured by the area D formed between the dash panel 2 and the second outer bead 32f. That is, even if the second outer bead 32f bends greatly and thereby the area C moves outwardly greatly, any contact of the area C of the front side frame 3 with the dash panel 2 can be avoided. Consequently, the dash panel 2 can be restrained from getting back (going rearwardly).

According to the present embodiment, since the front portion of the reinforcement 15, via which the sub frame 7 is joined to the front side frame 3, is located at the position which corresponds to the bending portion T1 of the front side frame 3 which is to be deformed so as to bend outwardly, in the vehicle width direction, by the collision load in the vehicle frontal collision, a properly large difference in the rigidity between the bending portion T1 and the reinforced portion of the front side frame 3 with the reinforcement 15 can be provided. Thereby, the bending deformation of the front side frame 3 at its bending portion T1 can be provided securely when the collision load acts on the front side frame 3. That is, the front portion of the reinforcement 15 can be used as the point causing the above-described bending deformation, so that the bending of the front side frame 3 at its bending portion T1 can be promoted. Consequently, the collision load against passengers can be decreased securely.

Further, since the first inner bead 31e is formed at the bending portion T1 of the inner panel 31 of the front side frame 3 so as to extend vertically, the above-described bending deformation of the front side frame 3 at the bending portion T1 can be further promoted by cooperation of the first inner bead 31e and the reinforcement 15.

Moreover, since the rear portion of the reinforcement 15 is located at the position which corresponds to the V-shaped bending portion T3 in front of the joint portion of the front side frame 3 to the dash panel 2, a properly large difference in the rigidity between the bending portion T3 and the reinforced portion of the front side frame 3 with the reinforcement 15 can be provided. Accordingly, the bending deformation of the front side frame 3 at the bending portion T3 can be provided securely when the collision load acts on the front side frame 3. Thus, even if the second outer bead 32f bends greatly and thereby the area C moves outwardly greatly, any contact of the area C of the front side frame 3 with the dash panel 2 can be avoided. Consequently, the dash panel 2 can be restrained from getting back (going rearwardly).

Also, since the second outer bead 32f of the outer panel 32 of the front side frame 3 is formed at the above-described bending portion T3 of the outer panel 32 of the front side frame 3 so as to extend vertically, the V-shaped bending deformation of the front side frame 3 at this bending portion T3 can be further promoted by cooperation of this second outer bead 32f and the reinforcement 15.

Meanwhile, since the closed cross section 30 which extends in the vehicle longitudinal direction is provided at the front side frame 3 and the reinforcement 15 is arranged inside this closed cross section 30 as shown in FIG. 4, the reinforcement 15 and part of the second rubber bush 14 (specifically, a male screw of the bolt 14a, nut 14b) can be arranged compactly by using a dead space in the above-described closed cross section. Further, the support rigidity of the reinforcement 15 can be increased by using a high rigidity of the closed cross section 30, so that the more large difference in the rigidity between the above-described bending portions T1, T3 and the reinforced portion of the front side frame with the reinforcement 15 can be provided. Thereby, the above-described bending deformations can be further promoted.

Further, since the bending portion T1 is provided in front of the joint portion of the front side frame 3 to the suspension tower 5 and the sub frame 7 is joined via the reinforcement 15 to the specified position of the front side frame 3 near the above-described joint portion, the valley portion which is formed at the boarder portion a (see FIG. 1 and others) at the suspension tower 5 can be used as the point causing the bending deformation of the front side frame 3 at the bending portion T1. Thereby, the bending deformation of the front side frame 3 at the bending portion T1 can be further promoted by cooperation of the reinforcement 15 and the above-described boarder portion a.

Moreover, since the branch frame 17 is provided so as to extend upwardly and rearwardly from its front portion which connects to the specified position of the front side frame 3 near the joint portion to the suspension tower 5 and has its rear portion which connects to the dash panel 2, the collision load can be transmitted effectively to the rear part of the vehicle body via this branch frame 17, and the front portion of the branch frame 17 can be used as the point causing the above-described outward bending deformation. Accordingly, the bending deformation of the front side frame 3 at the bending portion T1 can be promoted.

Also, since the branch frame 17 is connected to the upper face portion 32h of the front side frame 3 and the front portion of the upper face portion 32h is located at the position which corresponds to the bending portion T1, the front end of the upper face portion 32h of the front side frame 3 can be used as the point causing the above-described outward bending deformation.

Further, since the support plate 21 to support the engine mount 6 is provided at the front side frame 3 at the specified position in front of the bending portion T1, the rear portion of the support plate 21 having a high rigidity can be the point causing the above-described outward bending deformation.

Moreover, since the reinforcing member 18 is provided so as to connect the rear portion of the support plate 21 and the apron reinforcement 4 above the front side frame 3, the rear portion of the reinforcing member 18 can be the point causing the above-described outward bending deformation.

Embodiment 2

Figure 12:
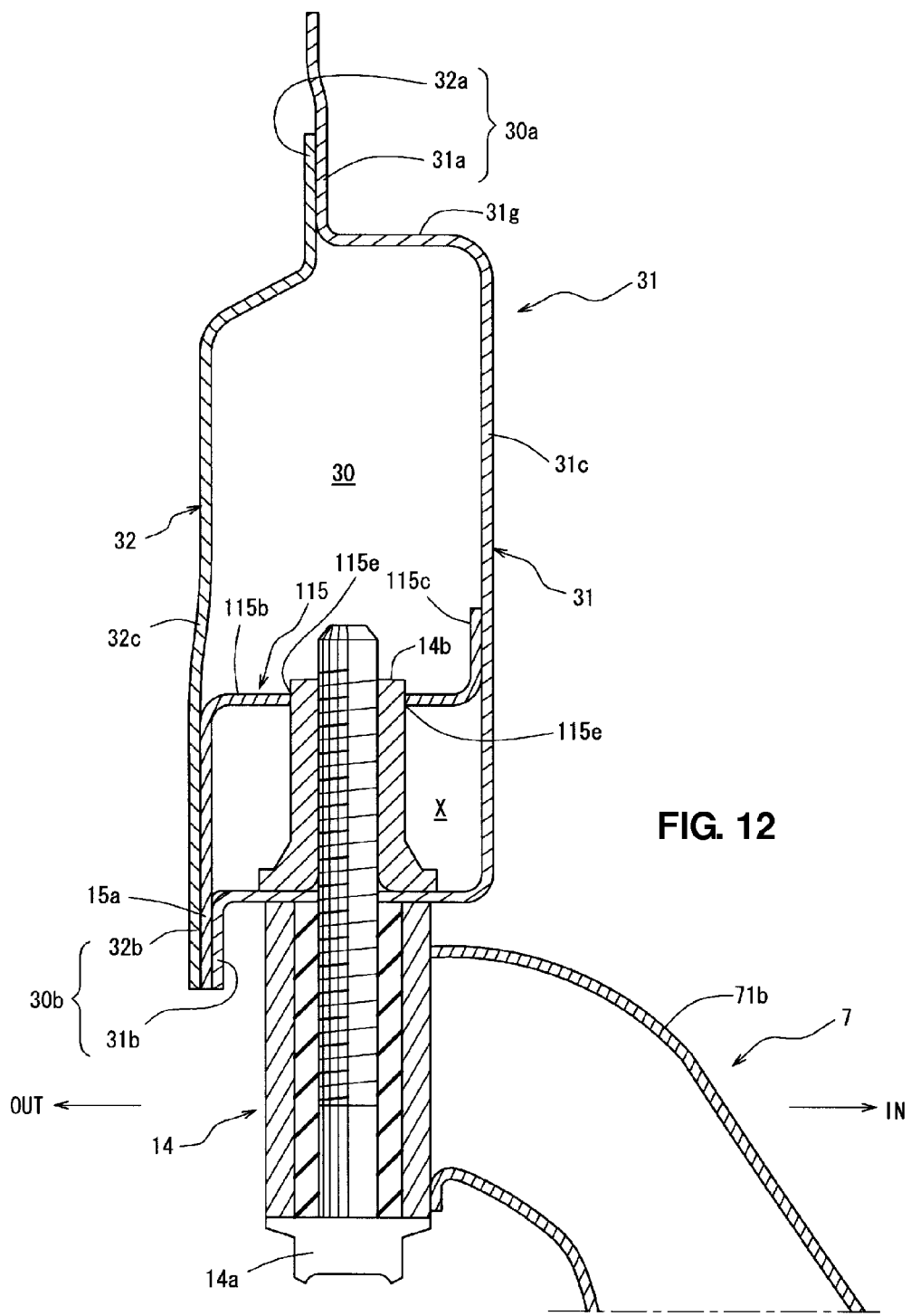
FIG. 12 is a sectional view of a major part of a front vehicle-body structure of a vehicle according to a second embodiment of the present invention.

In a second embodiment of the present invention, a reinforcing member 115 shown in FIG. 12 is applied instead of the reinforcing member 15 shown in FIG. 4 of the first embodiment. That is, the height position of a horizontal plate portion 115b which is continuous from a first vertical plate portion 115a, which corresponds to the first vertical plate portion 15a, is set to be higher than that of the horizontal plate portion 15b of the reinforcement 15 of the above-described first embodiment. Further, a second vertical plate portion 115c which is continuous from the horizontal plate portion 115b contacts a vertical portion of the inner panel body 31c via face contact. Thus, a second closed cross section X is formed in the closed cross section 30 of the front side frame 3. In FIG. 12, the same structure elements as those of the first embodiment are denoted by the same reference numerals, specific descriptions of which are omitted here.

In the second embodiment, a through hole 115e is formed at part of the horizontal plate, and the nut 14b of the second rubber bush 14 is inserted into this through hole 115e, so that both members are joined by welding. That is, according to the second embodiment, the horizontal plate portion 115b functions as the support member of the nut 14b, like the joint support piece 15d of the reinforcement 15.

Thus, since the second closed cross section X is formed inside the front side frame 3, the rigidity of the closed cross section 30 of the front side frame 3 can be increased more. Accordingly, the support rigidity of the reinforcement 115 in the closed cross section 30 can be further increased, so that the more large difference in the rigidity between the above-described bending portions T1, T3 and the reinforced portion of the front side frame with the reinforcement 115 can be provided.

The present should not be limited to the above-described embodiments, and any other modifications or improvements can be applied within the scope of a sprit of the present invention.

What is claimed is:

1. A front vehicle-body structure of a vehicle, comprising:
a dash panel partitioning a vehicle room from an engine room at a front vehicle body;
a front side frame connected to a front side of the dash panel and extending in a vehicle longitudinal direction, part of which is deformed so as to bend outwardly, in a vehicle width direction, by a collision load in a vehicle frontal collision;
a sub frame provided at a lower portion of the front vehicle body and joined to the front side frame;
a reinforcement provided at the front side frame,
wherein said sub frame is joined to the front side frame via said reinforcement, and a front portion of the reinforcement is located at a position which corresponds to a bending portion of said front side frame which is to be deformed so as to bend outwardly, in the vehicle width direction, by the collision load in the vehicle frontal collision;
a concave bead which is concaved outwardly, in the vehicle width direction, is formed at said bending portion of an inward side wall of said front side frame so as to extend vertically,
said front side frame is configured so that a second bending portion thereof which is located in back of said bending portion bending outwardly and in front of a connection portion thereof to said dash panel is deformed so as to bend, in the vehicle width direction, by the collision load in the vehicle frontal collision, and a rear portion of said reinforcement is located at another position which corresponds to said second bending portion;
a concave bead which is concaved inwardly, in the vehicle width direction, is formed at said second bending portion of an outward side wall of said front side frame so as to extend vertically,
said front side frame has a closed cross section which extends in the vehicle longitudinal direction, and said reinforcement is arranged inside said closed cross section,
a suspension tower is joined to said front side frame, said bending portion of the front side frame is provided in front of a joint portion of the front side frame to said suspension tower, and said sub frame is joined via the reinforcement to a specified position of the front side frame near said joint portion; and
a branch frame is provided so as to extend upwardly and rearwardly from a front portion thereof which connects to a specified position of said front side frame near said joint portion to said suspension tower and has a rear portion thereof which connects to said dash panel.

2. The front vehicle-body structure of a vehicle of claim 1, wherein said front side frame has an upper face at an outward upper position thereof, the upper face being formed so as to bend inwardly, in the vehicle width direction, toward an inside of a wheel house, said branch frame is connected to said upper face of the front side frame, and a front portion of said upper face is located at a position which corresponds to said bending portion.

3. The front vehicle-body structure of a vehicle of claim 2, wherein a support member to support an engine mount is provided at said front side frame at a specified position in front of said bending portion.

4. The front vehicle-body structure of a vehicle of claim 3, wherein an apron reinforcement which extends in the vehicle width direction is provided above the front side frame, and a reinforcing member is provided so as to connect a rear portion of said support member and said apron reinforcement.

5. A front vehicle-body structure of a vehicle, comprising:
a dash panel partitioning a vehicle room from an engine room at a front vehicle body;
a front side frame connected to a front side of the dash panel and extending in a vehicle longitudinal direction, part of which is deformed so as to bend outwardly, in a vehicle width direction, by a collision load in a vehicle frontal collision;
a sub frame provided at a lower portion of the front vehicle body and joined to the front side frame;
a reinforcement provided at the front side frame,
wherein said sub frame is joined to the front side frame via said reinforcement, and a front portion of the reinforcement is located at a position which corresponds to a bending portion of said front side frame which is to be deformed so as to bend outwardly, in the vehicle width direction, by the collision load in the vehicle frontal collision;
a suspension tower is joined to said front side frame, said bending portion of the front side frame is provided in front of a joint portion of the front side frame to said suspension tower, and said sub frame is joined via the reinforcement to a specified position of the front side frame near said joint portion; and
a branch frame is provided so as to extend upwardly and rearwardly from a front portion thereof which connects to a specified position of said front side frame near said joint portion to said suspension tower and has a rear portion thereof which connects to said dash panel.

6. The front vehicle-body structure of a vehicle of claim 5, wherein said front side frame has an upper face at an outward upper position thereof, the upper face being formed so as to bend inwardly, in the vehicle width direction, toward an inside of a wheel house, said branch frame is connected to said upper face of the front side frame, and a front portion of said upper face is located at a position which corresponds to said bending portion.

7. A front vehicle-body structure of a vehicle, comprising:
a dash panel partitioning a vehicle room from an engine room at a front vehicle body;
a front side frame connected to a front side of the dash panel and extending in a vehicle longitudinal direction, part of which is deformed so as to bend outwardly, in a vehicle width direction, by a collision load in a vehicle frontal collision;
a sub frame provided at a lower portion of the front vehicle body and joined to the front side frame;
a reinforcement provided at the front side frame,
wherein said sub frame is joined to the front side frame via said reinforcement, and a front portion of the reinforcement is located at a position which corresponds to a bending portion of said front side frame which is to be deformed so as to bend outwardly, in the vehicle width direction, by the collision load in the vehicle frontal collision,
a support member to support an engine mount is provided at said front side frame at a specified position in front of said bending portion; and
an apron reinforcement which extends in the vehicle width direction is provided above the front side frame, and a reinforcing member is provided so as to connect a rear portion of said support member and said apron reinforcement.

* * * * *